United States Patent [19]

Stepina

[11] 3,965,380
[45] June 22, 1976

[54] SLIDING ARMATURE BRAKING MOTOR

[75] Inventor: Jaroslav Stepina, Kaiserslautern, Germany

[73] Assignee: Siemens Aktiengesellschaft, Munich, Germany

[22] Filed: Sept. 24, 1973

[21] Appl. No.: 399,950

[30] Foreign Application Priority Data

Sept. 25, 1972 Germany............................. 2246962

[52] U.S. Cl.................................. 310/77; 310/209; 310/211; 310/212
[51] Int. Cl.² ..................... H02K 7/16; H02K 17/18
[58] Field of Search .............. 310/77, 209, 211, 212

[56] References Cited
UNITED STATES PATENTS

| | | | |
|---|---|---|---|
| 2,869,008 | 1/1959 | Carlsen ........................... | 310/211 X |
| 3,233,135 | 2/1966 | Holzer et al. ........................ | 310/209 |
| 3,567,980 | 3/1971 | Kreuter ............................... | 310/209 |

*Primary Examiner*—Mark O. Budd
*Attorney, Agent, or Firm*—Kenyon & Kenyon Reilly Carr & Chapin

[57] ABSTRACT

An arrangement for increasing the axial displacement force in a sliding armature braking motor in which an intermediate short circuit ring displaced from the end of the stack of rotor laminations is provided along with conventional short circuit rings at each end of the laminations to thereby materially increase the axial displacement force.

5 Claims, 1 Drawing Figure

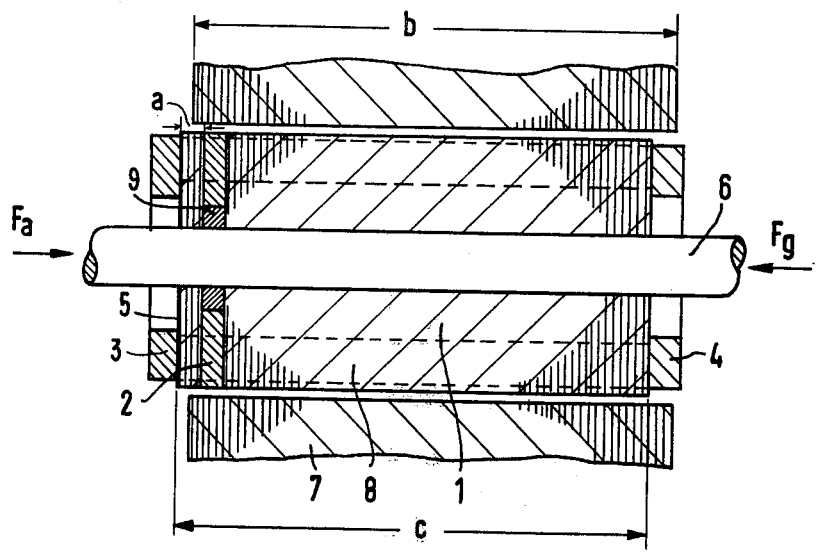

SLIDING ARMATURE BRAKING MOTOR

BACKGROUND OF THE INVENTION

This invention relates to sliding armature braking motors in general and more particularly to an improved arrangement for increasing the axial force in such a motor. Sliding armature braking motors in which the rotor of the motor is biased by a spring or other means to cause a brake disc to be held against a braking surface and which rotor when energized develops forces to move the brake disc away from the braking surface are known in the art. One such arrangement is described in German Auglegeschrift No. 1,037,570 in which a motor with a conical rotor is provided. When the end face of the lamination stack is near the air gap, an iron body, by which part of stator stayed flux is deflected from its normal path leading transversely to the heads of the teeth in the slots, conducts a portion of the flux. In another known design, the spring acting in the axial direction is further designed as a torque spring and held with its one end at the shaft of the drive motor and its other end at the brake disc and is guided on the shaft rotatably and movable length wise. Through this arrangement the braking motor need not start up immediately after it is switched on, but enters into a phase of power transmission between the shaft and braking disc through the then tensioned torsion spring. Only when the slip is small and after it has reached its maximum torque does it develop a large electromagnetic force for lifting the brake disc.

Designs such as this which have a large number of moving parts are relatively expensive and trouble prone. In order to get along without these moving parts the axial braking pressure must be reduced which results in an undesirable expansion of the runout time during braking. Another solution is to make the braking motor larger for the same required braking power.

Thus, it can be seen that there is a need for a braking motor of this nature having a simple design and which provides the high braking forces required.

SUMMARY OF THE INVENTION

A motion of this nature when not energized will be in a condition where the rotor laminations extend on one end out beyond the stack of stator laminations. The axial force is determined by the air gap induction in the region of displacement. Typically such motors have shorting rings at each end of the rotor laminations which rings are electrically connected to a plurality of rotor bars running through the laminations. The present invention provides such a motor with increased braking forces by providing an intermediate short circuit ring arranged within the stack of rotor laminations near but displaced from one end, which short circuit ring has an electrical conductivity as high as that of the rotor bars, along with a conventional short circuit ring at the other end of the stack of rotor laminations.

In one embodiment of the invention, in addition to the conventional short circuit ring at the other end and the intermediate short circuit ring displaced from the one end, a second conventional short circuit ring is also placed at the one end resulting in a total of three short circuit rings, one at each end and one slightly displaced from the one end. In this embodiment, the initial position of the rotor when not energized is chosen so that the intermediate short circuit ring is situated within the radial limitation of the corresponding end face of the stator laminations.

It should be noted, that a sliding armature motor with a cage rotor having two short circuiting rings at the end faces and an intermediate short circuiting ring has been described in U.S. Pat. No. 2,869,008. However, the arrangement described therein is based on a fundamentally different and almost opposite problem. That is the arrangement using the intermediate ring is installed to provide a weakening of the axial force in certain regions in order to provide soft settling of the axially movable rotor into a definite axial position. This is different than the problem of the present invention wherein an increase rather than a weakening of axial force is desired. In the arrangement disclosed therein the intermediate ring is selected of a material having higher electrical conductivity and the stroke of the rotor is chosen so that the intermediate ring is situated outside the radial limitation of the stack of stator laminations.

In the present invention, the total electrical resistance of the intermediate short circuit ring and the adjacent conventional short circuit ring at the one end face of the rotor cage, is preferably equal to the resistance of the short circuit ring at the other end. Or, in other words, it is equal to the resistance which would be provided if only a single conventional ring were provided at the other end. In addition, the total length of the stack of rotor laminations including that in which the intermediate short circuit ring is mounted should be no larger than the length of the stack of stator laminations. The axial length of the section of the stack of rotor laminations outside the intermediate short circuit ring or between the intermediate short circuit ring and the conventional short circuit ring at the one end face is made essentially equal to the maximum operating axial excursion of the displaceable rotor. If the axial length is somewhat larger, this distance can be up to three times the width of the air gap.

Also disclosed is a method of making the intermediate short circuit ring in which the intermediate ring is cast simultaneously with the conductors in the short circuit rings at the end faces of the cage rotor by the injection of die casting method. When carrying out this method it is advantageous to interpose a spacer between the lamination of the rotor stack adjacent to the intermediate ring when the rotor laminations are stacked.

Brief Description of the Drawings

The single FIGURE is a cross-sectional view of a motor according to the present invention.

Detailed Description of the Preferred Embodiment

As illustrated on the FIGURE, a motor is shown comprising a rotor 1 and a stator 7. The rotor comprises a plurality of stacked laminations placed on a rotor shaft 6 and into which are cut slots for a plurality of rotor bars 8. Conventional short circuit rings 3 and 4 are shown at the one and other ends of the motor and are connected to the conductors 8. The conductors or rotor bars 8 are located in straight or skewed slots in the laminations in conventional fashions. Preferably, as will be described below, the rotor bars 8 are cast simultaneously with the short circuit rings 4.

A spring force $F_g$ acts against the rotor which has mounted to it a brake disc which acts against a brake lining (not shown). The force $F_a$ is the force developed in the motor which acts against the force $F_g$ to lift the brake disc away from the brake lining when the motor is energized. When energized, the end 5 of the motor will move to be under the laminations 7 of the stator. The present invention, to obtain increased axial displacement forces provides an intermediate short circuit ring 2 which is displaced from the end 5 of the rotor. In the embodiment illustrated, the total electrical resistance of the intermediate short circuit ring 2 and the conventional short circuit ring 3 should be equal to the resistance of the short circuit ring 4 on the right hand side. Or, such resistance should be equal to the resistance of a single conventional ring 3 which would be placed at the end 5 if the intermediate ring was not used. The ratio of the cross-sections of the short circuit ring 3 to the intermediate ring 2 should be chosen in accordance with the desired air gap induction desired at the start of the motor above the short section of the laminated rotor stack of the axial length a between the left hand shorting ring 3 and the intermediate ring 2 as compared to the remaining section of the laminated rotor stack.

Part of the rotor currents which flow in the conductor bars 8 will be conducted through the intermediate ring 2 so that the damping effects of the rotor current on the air gap field will be attenuated over the short section of length a of the stack of rotor laminations. If desired, the short circuit ring 3 of the left hand side can be omitted. This is done if a particularly large axial force is required on starting. The additional stray flux of the stator resulting from the incorporation of the intermediate ring 2 does not appreciably affect the operating characteristic of the motor.

The axial length a of the small section of the stack of rotor laminations which in the illustrated embodiment is between the rings 2 and 3 and which in the case of a single ring 2 would be outside that ring, should essentially be equal to or somewhat larger than the maximum operational axial excursion of the displaceable rotor or the brake disc. At a maximum it can be up to three times the width of the air gap. The total axial length c of the stack of rotor laminations should not exceed the total length b of the stack of stator laminations. The inner (right hand) edge of the small section of the rotor lamination stack of length a should be situated underneath the radial limitation at the end face of the left hand end of the stack of stator laminations, as seen in the direction of the axis, when the brake is applied. That is, if the rotor is shifted to the left, and if the brake is lifted against the axial spring force causing the rotor to be shifted to the right, the outer edge of the small section of length a should be selected so that it is still somewhat outside the radial limitation at the end face of the left hand end of the stator lamination stack in order that an electromagnetic axial force will act on the rotor to hold the balance against the above described spring force. Tests have shown that with a small braking motor having an intermediate shorting ring 2 constructed according to the present invention, about twice the axial force which is attainable with a conventional braking motor can be obtained.

Construction of the motor bars and shorting rings of the present invention will preferably be done by injection die casting. All of the rotor bars 8, along with the shorting rings 2, 3 and 4 can be simultaneously cast using this method. When making the lamination stack it is advantageous to place a spacer 9 in the stack so that after the die casting the desired radial dimension and the desired axial dimension of the short circuit ring 2 may be obtained to thereby obtain the desired resistance.

Thus, an improved sliding armature braking motor has been described. Although specific embodiments have been illustrated and described, it will be obvious to those skilled in the art that various modifications may be made without departing from the spirit of the invention which is intended to be limited solely by the appended claims.

I claim:

1. A sliding armature braking motor of the type having a cage rotor which braking motor provides an increased axial force, comprising:
   a. a laminated stator;
   b. a plurality of rotor laminations mounted on a rotor shaft with the stack of rotor laminations having one end lying outside the axial limitations of the corresponding end of the stator laminations when in an unenergized condition;
   c. a plurality of rotor bars inserted in slots in said laminations;
   d. an intermediate short circuit ring arranged in said stack of laminations near said one end said intermediate short circuit ring having an electrical conductivity as high as that of the rotor bars and in electrical contact therewith;
   e. a first end face short circuit ring electrically connected to said rotor bars at the other end;
   f. a second end face short circuit ring placed at said one end in electrical contact with said rotor bars and wherein said intermediate short circuit ring is placed so that in the unenergized condition, said intermediate short circuit ring is within the radial limitation of the corresponding end face of said stack or stator laminations.

2. The invention according to claim 1 wherein the electrical resistance of said intermediate short circuit ring is equal to the electrical resistance of said first end face short circuit ring.

3. The invention according to claim 1, wherein the total electrical resistance of said intermediate short circuit ring and said second end face short circuit ring are equal to the resistance of said first end face short circuit ring.

4. The invention according to claim 1, wherein the total length of the stack of rotor laminations is equal to or smaller than the length of the stack of stator laminations.

5. The invention according to claim 1, wherein the axial length of the section of rotor laminations outside the intermediate short circuit ring is essentially equal to the maximum operational axial excursion of the rotor.

* * * * *